United States Patent
VanBlon et al.

(10) Patent No.: US 10,430,503 B2
(45) Date of Patent: Oct. 1, 2019

(54) ELECTRONIC DISPLAY CONTENT FITTING

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); Nathan J. Peterson, Durham, NC (US); Rod D. Waltermann, Rougemont, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/683,753

(22) Filed: Apr. 10, 2015

(65) Prior Publication Data
US 2016/0300373 A1     Oct. 13, 2016

(51) Int. Cl.
*G06F 17/22* (2006.01)
*G06F 17/21* (2006.01)
*G06F 17/27* (2006.01)

(52) U.S. Cl.
CPC ........ *G06F 17/2264* (2013.01); *G06F 17/211* (2013.01); *G06F 17/2217* (2013.01); *G06F 17/273* (2013.01)

(58) Field of Classification Search
CPC ........ G06T 11/203; G09G 5/24; G09G 5/222; G06F 17/214; G06K 15/02
See application file for complete search history.

(56) References Cited

U.S. PATENT DOCUMENTS

| | | | | |
|---|---|---|---|---|
| 6,292,794 | B1* | 9/2001 | Cecchini | G06F 17/30696 |
| 7,003,724 | B2* | 2/2006 | Newman | H04L 12/58 709/206 |
| 7,475,343 | B1* | 1/2009 | Mielenhausen | G06F 17/24 715/261 |
| 7,515,903 | B1* | 4/2009 | Cast | H04L 51/066 455/413 |
| 7,869,824 | B2* | 1/2011 | Min | G08C 17/02 455/418 |
| 2003/0003931 | A1* | 1/2003 | Silventoinen | H04L 12/583 455/466 |
| 2005/0044506 | A1* | 2/2005 | Makela | G06F 17/30905 715/801 |
| 2005/0240391 | A1* | 10/2005 | Lekutai | H04M 1/72552 704/2 |

(Continued)

OTHER PUBLICATIONS

Random Idea English, Instant exercise generator—vowel remover plus, Jun. 4, 2012, 2 pages. Available at http://random-idea-english.blogspot.com/2012/06/instant-exercise-generator-vowel.html.

*Primary Examiner* — Abderrahim Merouan
(74) *Attorney, Agent, or Firm* — Ference & Associates LLC

(57) ABSTRACT

An embodiment provides a device, including: a display device; a processor operatively coupled to the receiver; and a memory comprising instructions that are executed by the processor to: analyze a received communication comprising one or more words to identify text characters; identify a shortened representation for display of one or more of the text characters; shorten the one or more of the text characters using the shortened representation; and output display data including the shortened representation to the display device. Other embodiments are described and claimed.

17 Claims, 3 Drawing Sheets

(56) References Cited

U.S. PATENT DOCUMENTS

| | | | |
|---|---|---|---|
| 2006/0250834 A1* | 11/2006 | Chinn | G06F 3/0482 |
| | | | 365/63 |
| 2008/0274756 A1* | 11/2008 | Hassan | G06Q 10/107 |
| | | | 455/466 |
| 2009/0144260 A1* | 6/2009 | Bennett | G06F 17/3087 |
| 2009/0199075 A1* | 8/2009 | Demjanenko | H03M 13/158 |
| | | | 714/784 |
| 2010/0042916 A1* | 2/2010 | Greenfield | G06F 17/217 |
| | | | 715/251 |
| 2010/0145676 A1* | 6/2010 | Rogers | G06F 17/30905 |
| | | | 704/9 |
| 2011/0055340 A1* | 3/2011 | Bautista | G06F 17/3087 |
| | | | 709/206 |
| 2011/0307822 A1* | 12/2011 | Park | G06F 3/04883 |
| | | | 715/773 |
| 2012/0223934 A1* | 9/2012 | Takami | G06F 3/14 |
| | | | 345/418 |
| 2013/0090917 A1* | 4/2013 | Chalmers | G06F 17/212 |
| | | | 704/9 |
| 2015/0142822 A1* | 5/2015 | Xue | G06F 17/3087 |
| | | | 707/743 |
| 2015/0264105 A1* | 9/2015 | V | H04L 67/02 |
| | | | 709/201 |
| 2016/0048500 A1* | 2/2016 | Hebert | G06F 17/278 |
| | | | 704/9 |
| 2016/0335244 A1* | 11/2016 | Weisman | G06F 17/273 |

* cited by examiner

ELECTRONIC DISPLAY CONTENT FITTING

BACKGROUND

Electronic devices such as laptops, tablets, smart phones, smart-watches or other wearables, etc. ("devices") are used to view various types of content. Among the different types of content are text based messages (e.g., SMS-messages, emails, web pages, etc.), graphics or image content, including video, and displayable data that incorporates both text and graphics and images. Devices have decreased in physical size, particularly tablets, phones, and wearables, and this size reduction has included a reduction in the size of the display device.

BRIEF SUMMARY

In summary, one aspect provides a device, comprising: a display device; a processor operatively coupled to the receiver; and a memory comprising instructions that are executed by the processor to: analyze a received communication comprising one or more words to identify text characters; identify a shortened representation for display of one or more of the text characters; shorten the one or more of the text characters using the shortened representation; and output display data including the shortened representation to the display device.

Another aspect provides a method, comprising: analyzing a received communication comprising one or more words to identify text characters; identifying a shortened representation for display of one or more of the text characters; shortening the one or more of the text characters using the shortened representation; and outputting display data including the shortened representation to a display device.

A further aspect provides a program product, comprising: a computer readable storage device having computer readable program code, the computer readable program code being executable by a processor and comprising: code that analyzes a received communication comprising one or more words to identify text characters; code that identifies a shortened representation for display of one or more of the text characters; code that shortens the one or more of the text characters using the shortened representation; and code that outputs display data including the shortened representation to a display device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
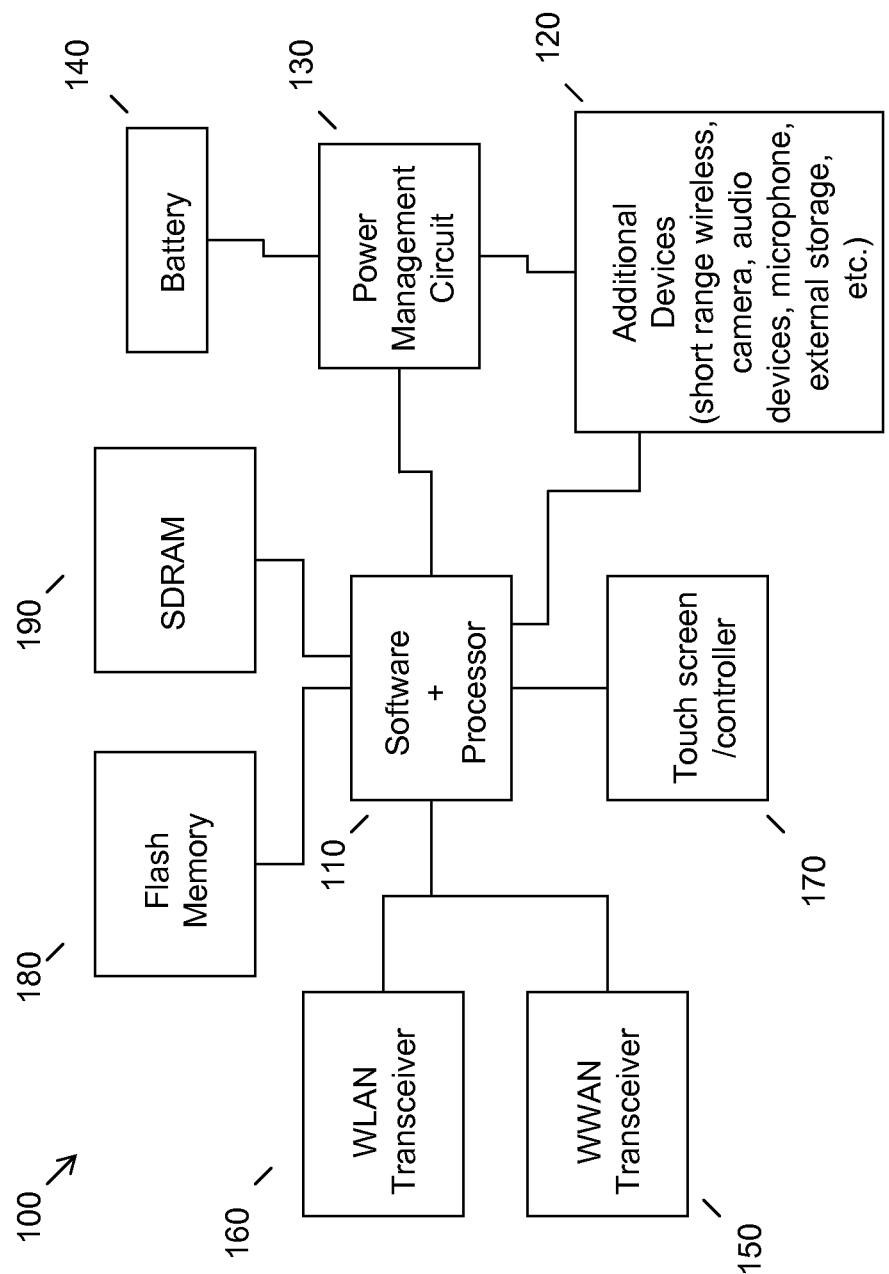
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When reading a message on a small display device, content sometimes does not fit. This is especially true of incoming messages on a smart watch screen. The user may scroll, zoom out, or use a smaller font, but this requires user input and makes it harder to see the content and to easily understand the message.

Accordingly, an embodiment shortens an incoming message or piece of content so that it fits on a given piece of screen real estate. That is, an embodiment may modify the content such that it is appropriately re-sized, e.g., taking into consideration the device screen size. Methods of shortening content may include removal of certain types of characters such as vowels from a text string. Removal of larger pieces of content, e.g., removal of certain words from a sentence of phrase, may also be performed. For example, words considered unimportant or less important to the user's understanding or readability of the phrase or sentence may be removed, e.g., "at," "the," "of," etc. In other words, an embodiment may remove parts of a phrase or sentence (characters, words, etc.) using predefined rules because some of the content may be removed without impacting the user's ability to comprehend the message.

An embodiment may selectively resize portions of the content. For example, an embodiment may make unimportant or less important content (e.g., words) a smaller font size. This permits the entire message to be presented, but with certain words related to the user's ability to comprehend the message quickly appearing larger than words deemed less important or unimportant.

An embodiment may also iconize or represent certain content such as words or phrases with a symbol. In this way, an image or graphic may be used instead of a string of letters, which uses less space than the text based content. For example, a message including the phrase "Doctor Appointment" may be replaced with icon or graphic equivalent. Icons or graphics (including picture or image content) may be used in place of text content for contact names, places, people, terms, etc., all of which tend to shorten the text of the message in question. In an embodiment, a user may select a shortening technique or techniques, e.g., a user may select from a list of icons or graphics to be used in place of text based content, e.g., a word or phrase in a message may be identified and replayed by a known icon, rhyming, etc.

An embodiment may also convert text based content (e.g., characters forming a word or phrase) to known or commonly used abbreviations or acronyms. For example, an embodiment may convert a text based character string of "you" to "u," as another example "Gotta go," may be changed to "GG," likewise "I don't know" may be resized to "IDK," the sound of the full and abbreviated version may be used, e.g., "great" replaced with "gr8," etc. Such abbreviations or slang representations are commonly used at the time of inputting a message; however, an embodiment may convert the full form of the text string input into such abbreviated representations automatically, e.g., at display time based on the device's screen size.

Shortened content such as converted words or phrases may be indicated, e.g., via highlighting or other indicator, to inform the user that this content has been condensed or shortened. The user may then select condensed message content if needed to revert or obtain the text to an original form, i.e., the full-length text content. Depending on the shortening technique, the message may include a reference or link to an expanded version, e.g., a reference or link to a rule set or a common set of full and abbreviated versions or the full version may be retrieved (locally or remotely) and displayed as an original message content in unabridged form. Likewise, an embodiment may expand content that has been reduced in size, either temporarily or permanently, e.g., based on user selection. For example, the expanded content, in terms of size (if a font size has been reduced) and/or content (if the content has been shortened) may be temporarily expanded or enlarged. An embodiment may for example provide a temporary magnification or text expansion to display original content, e.g., based on user input. An embodiment may make such reversions permanent.

A combination of the techniques referenced herein may be used, e.g., depending on the context. For example, if the user expands words that have been shortened, this may indicate that the user does not understand something that was shortened. Such data may be used as feedback to refine which technique(s) are employed, and when. The user may also provide explicit feedback or input settings data. For example, a user may specify which types of content are to be shortened and which types of content are to be left as-is. For example, a user (sending and/or receiving) may choose a content type such as text messages, calendar events, emails, web pages, transcribed voicemails, etc., that are to be or are not to be abbreviated or shortened. Moreover, a user may clarify explicitly or implicitly which sub-portions of content are to be shortened, e.g., clarify a list of acceptable abbreviations for text or acceptable graphics or icons that are to be used.

The illustrated example embodiments will be best understood by reference to the figures. The following description is intended only by way of example, and simply illustrates certain example embodiments.

While various other circuits, circuitry or components may be utilized in information handling devices (also referred to herein as apparatuses, electronic devices, or simply devices), with regard to low power circuitry 100, an example illustrated in FIG. 1 includes a system design found for example in smaller devices such as a tablet or other mobile computing platforms such as a wearable device, e.g., smart watch. Software and processor(s) are combined in a single circuit 110. Processors comprise internal arithmetic units, registers, cache memory, busses, I/O ports, etc., as is well known in the art. Internal busses and the like depend on different vendors, but essentially all the peripheral devices (120) may attach to a single circuit 110. The circuitry 100 combines the logic or a processor, memory control, and I/O controller hub all into a single circuit 110.

There may be separate power management chip(s) 130, e.g., a battery management circuit, which manage power as supplied, for example, via a rechargeable battery 140, which in turn may be recharged by a connection to a power source.

System 100 may include one or more of a WWAN transceiver 150 and a WLAN transceiver 160 for connecting to various networks, such as telecommunications networks and wireless Internet devices, e.g., access points. However, if a lower powered implementation is desired, additional devices 120 may be included or take the place of more power-intensive components, e.g., a short range wireless component such as BLUETOOTH LE component may be included. System 100 may include a touch screen 170, which may be a lower powered implementation using a power conserving material such as E-INK display materials, for data input and display/rendering. The touch screen 170 may of course be replaced or substituted with a simpler display, which again may be designed with lower power consumption in mind. System 100 may also include a memory device, e.g., flash memory 180 and/or SDRAM 190.

Figure 2:
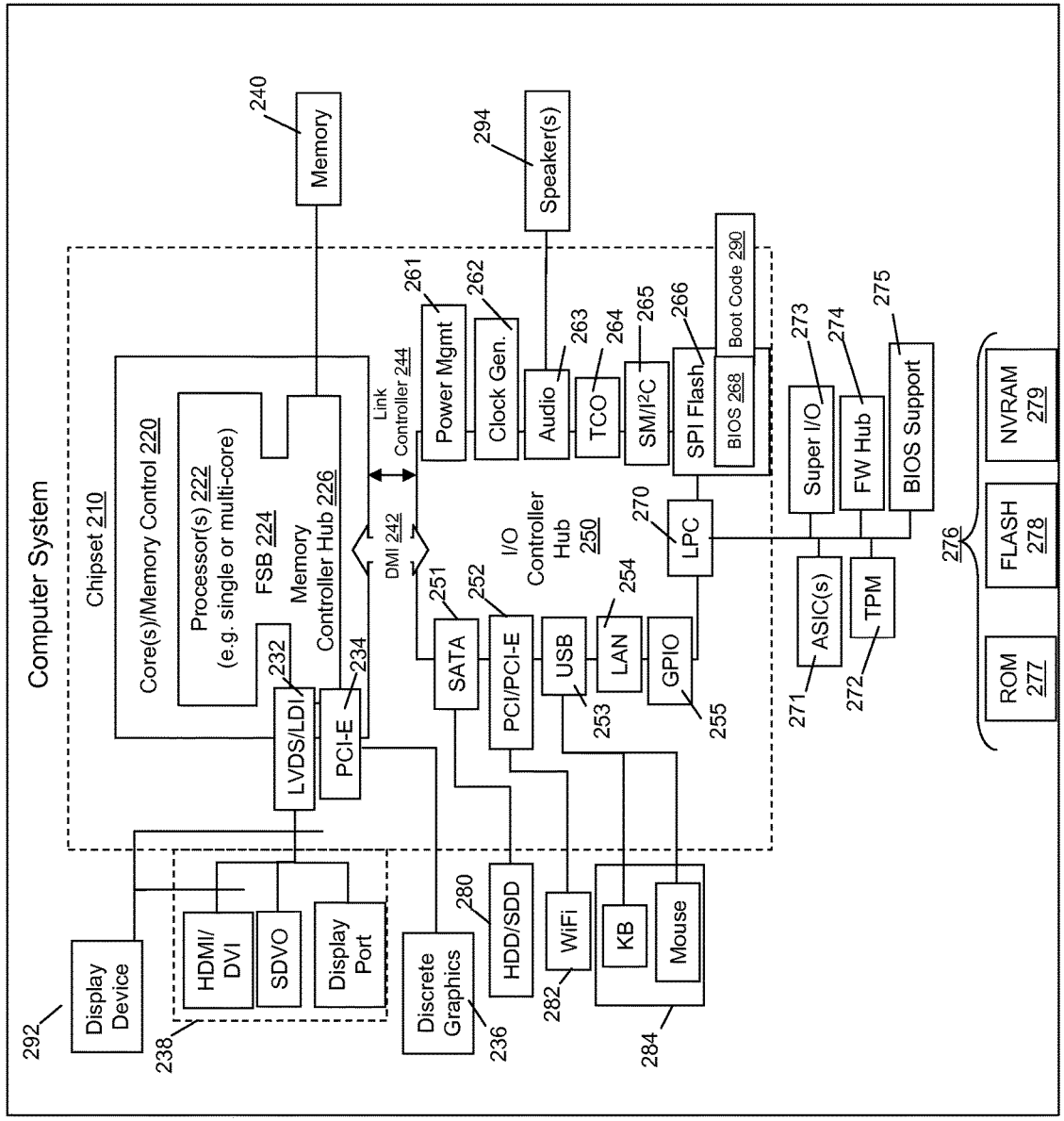
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2. The circuitry of FIG. 2 may be included in an embodiment, e.g., in a system implementation where a higher powered device, such as one including circuitry outlined in the example of FIG. 2, communicates with a lower powered wearable unit or device, e.g., a smart watch including circuitry such as outlined in the example of FIG. 1.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Circuitry, as for example outlined in FIG. 1 or FIG. 2, may be used in devices or systems that display content using a display screen of reduced size. An embodiment is described herein by way of example with reference to a smart watch. However, those having ordinary skill in the art will recognize that the principles discussed in connection with this non-limiting example may be extended to other implementations, e.g., other wearable devices, other mobile devices, and to systems that include more than one device (e.g., tablet or laptop computer communicating with a smart watch).

Figure 3:
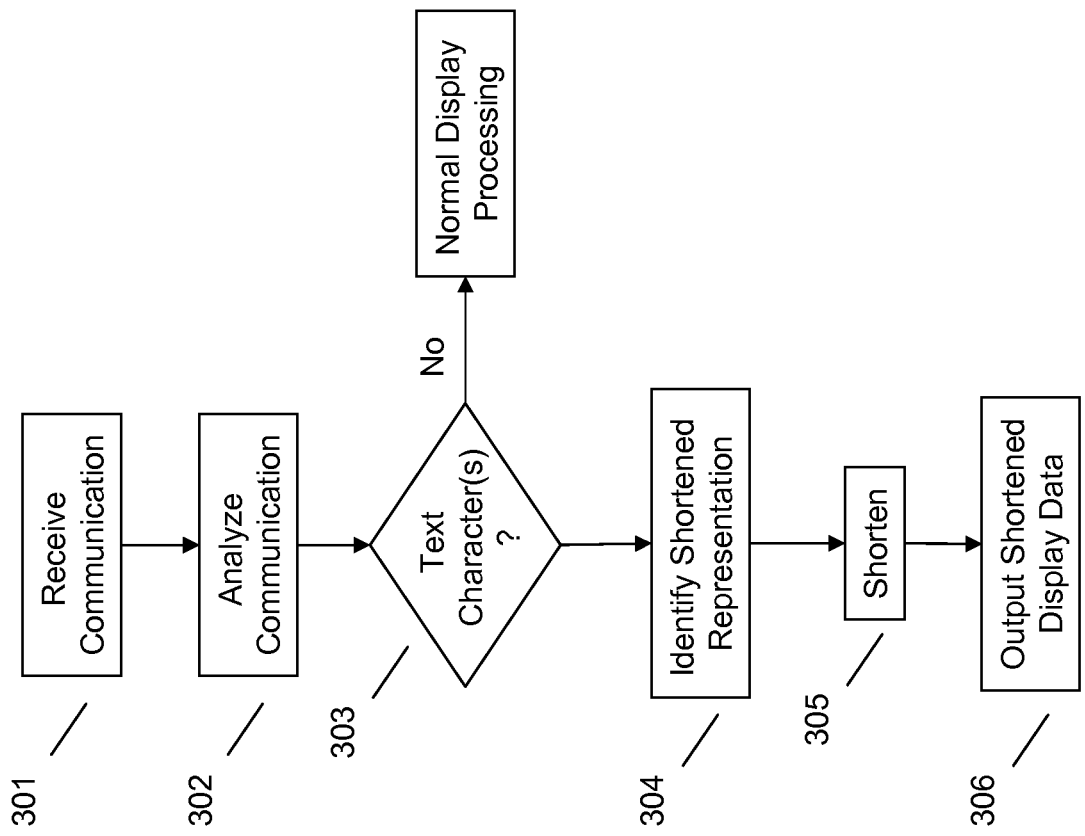
FIG. 3 illustrates an example content fitting technique according to an embodiment.

FIG. 3 illustrates a general outline of a method for electronic display content fitting. As illustrated in FIG. 3, a receiver of a device such as a smart watch receives a wireless communication including text characters at 301. Conventionally a device will provide scaling and simply output the content of the received communication to the display device. This may include scaling the overall font size of text or displaying only part of the message and providing a scrolling option or function. As described herein, each of these techniques has drawbacks, including making it difficult for the user to comprehend the entire message or a large portion of it quickly.

Accordingly, an embodiment analyzes the received communication to identify text characters therein at 302. If text characters are contained within the communication, as determined at 303, an embodiment identifies a shortened representation for display of one or more of the text characters at 304. If the content does not include text characters or like elements that may be shortened or condensed, e.g., the received communication is an image, normal display processing may be conducted.

However, if the communication includes text character(s), an embodiment proceeds to identify a shortened representation at 304. As described herein, the shortened representation may take a variety of forms and may be influenced by the underlying content. For example, if text characters are included in the communication that are amenable to shortening based on abbreviation, colloquial forms, or shortened forms (e.g., "phone" for "telephone," "Gr8" for "great," etc.), an embodiment may identify these substitutes as a shortened representation. Likewise, if a word or phrase in the text data of the communication may be shorted by substituting a graphic representation, this may also be done, alone or in combination with another shortening technique. Various rules and data sources (e.g., grammar rules, linguistic rules, word form hierarchies, abbreviations, graphical representations or icons, etc.) may be utilized, whether stored on the local (i.e., communication receiving device) or remotely and accessible by the local device. These rules and data sources may be provided by the user (e.g., the user forms outgoing messages with a given abbreviation, so received messages may also be shortened using this abbreviation) or these rules and data sources may be provided by groups or communities (e.g., generally accepted rules and data sources), or both.

Additionally, if the text data or a portion thereof is not amenable to such shortening, another technique may be applied. For example, an embodiment may identify that, although an abbreviation or icon is not readily identifiable for a particular text string, the text string may be shortened by removing vowels or other characters there-from. Likewise, an embodiment may identify that the text string contains certain key words (e.g., verbs, proper names, etc.) that are predicted (e.g., in real time or by a prior application of a rule set) to be more important than others. Thus, an embodiment may remove some or all of the words from a communication deemed less important or unimportant. As with the other techniques, the data source and/or rules (e.g., list of important words) and logic (e.g., rules for identifying important words) may be stored locally or remotely, and such techniques may be used in combination with others.

It is worth noting at this point that the local device may not do all of the processing. For example, some or all of the processing may be offloaded to a connected device, e.g., a laptop or tablet device that is operatively coupled to a smart watch or other wearable that acts as the receiving end user device. Thus, the coupled device may feed a shortened version of the original communication to the end user device. It is also worth noting that the connected device may be immediately connected to the end user device (e.g., smart watch) for example using local short range wireless communication or may be one of several intervening devices, e.g., a cloud server that prepares and sends a shortened version of the communication to the wearable device, e.g., based on device identification, etc. In at least one embodiment, the sending device may process the outgoing, original communication to a shortened form or provide information therewith for preparing a shortened form thereafter.

In any event, once the shortened representation is identified, an embodiment shortens the one or more of the text characters using the shortened representation at 305. This may include, for example, providing the shortened version in place of the original version of the text data. Thus, an embodiment may output display data including the shortened representation to the display device at 306.

In an embodiment, the shortening of the one or more of the text characters comprises including the shortened representation in place of the one or more of the text characters. As described herein, a shortened representation may include a text character string having one or more characters removed there-from, e.g., at least one vowel and/or an icon, and/or a shortened representation may include a reduced size of the one or more of the text characters or a reduced size of a previously shorted text string or previously selected icon.

In an embodiment, the predetermined rule is influenced by input of a user. For example, an embodiment may provide an indication that the shortened representation has been included for output to the display device. Thus, a user may be apprised that a shortened form has been displayed. This gives the user an option to display the original, longer version of the message, e.g., by interfacing the device. As may be appreciated, depending on the data that has been received by the end user device, the end user device may compile the original message from already received data or may obtain the original data from another device. Thus, a user has an option to display one or more original text characters replaced by the shortened representation.

User provided data may be used for other purposes as well. For example, an embodiment may keep track of how often a user requests the original message such that a profile of shortening techniques is created for the user. This may influence which shortening techniques are subsequently applied. As may be appreciated, this user provided data may be inferred, e.g., based on requests for the original content, or may be explicitly provided by the user, e.g., in the form of settings data.

An embodiment therefore represents a technological improvement in the area of device display functioning and in fact to the area of communications technology. An embodiment supplies techniques for data display that permit reduced screen size use while preserving and improving the operation of devices that utilize small display screens to display data, particularly text-data contained in communications.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a storage device such (non-signal storage device), where the instructions are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., short range wireless communication or near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A device, comprising: a display device;
   a processor operatively coupled to a receiver; and
   a memory comprising instructions that are executed by the processor to:
   analyze a received communication comprising one or more words to identify text characters;
   identify a non-synonym shortened representation for display of one or more of the text characters, wherein the shortened representation is selected based on display size and is identified based upon a shortening technique provided by a user and wherein the shortening technique corresponds a content type of the text characters, wherein the shortened representation comprises selectively resized portions of the one or more text characters to a smaller font size;
   shorten the one or more of the text characters using the shortened representation; and
   output display data including the shortened representation to the display device.

2. The device of claim 1, wherein to shorten the one or more of the text characters comprises including the shortened representation in place of the one or more of the text characters.

3. The device of claim 1, wherein the shortened representation is a text character string having one or more characters removed there-from.

4. The device of claim 3, wherein the one or more characters removed includes at least one vowel.

5. The device of claim 1, wherein the shortened representation is an icon.

6. The device of claim 1, wherein the shortened representation is determined based on a predetermined rule.

7. The device of claim 6, wherein the predetermined rule is influenced by input of a user.

8. The device of claim 1, further comprising a receiver that receives wireless communications including the received communication.

9. The device of claim 1, wherein the instructions are executed by the processor to display one or more original text characters replaced by the shortened representation.

10. A method, comprising:
analyzing a received communication comprising one or more words to identify text characters;
identifying a non-synonym shortened representation for display of one or more of the text characters, wherein the shortened representation is selected based on display size and is identified based upon a shortening technique provided by a user and wherein the shortening technique corresponds a content type of the text characters, wherein the shortened representation comprises selectively resized portions of the one or more text characters to a smaller font size;
shortening the one or more of the text characters using the shortened representation; and
outputting display data including the shortened representation to a display device.

11. The method of claim 10, wherein the shortening the one or more of the text characters comprises including the shortened representation in place of the one or more of the text characters.

12. The method of claim 10, wherein the shortened representation is a text character string having one or more characters removed there-from.

13. The method of claim 12, wherein the one or more characters removed includes at least one vowel.

14. The method of claim 10, wherein the shortened representation is an icon.

15. The method of claim 10, wherein the shortened representation is determined based on a predetermined rule.

16. The method of claim 15, wherein the predetermined rule is influenced by input of a user.

17. A program product, comprising:
a computer readable storage device having computer readable program code, the computer readable program code being executable by a processor and comprising:
code that analyzes a received communication comprising one or more words to identify text characters;
code that identifies a non-synonym shortened representation for display of one or more of the text characters, wherein the shortened representation is selected based on display size and is identified based upon a shortening technique provided by a user and wherein the shortening technique corresponds a content type of the text characters, wherein the shortened representation comprises selectively resized portions of the one or more text characters to a smaller font size;
code that shortens the one or more of the text characters using the shortened representation; and
code that outputs display data including the shortened representation to a display device.

* * * * *